US007175787B2

(12) United States Patent
Ebert et al.

(10) Patent No.: US 7,175,787 B2
(45) Date of Patent: Feb. 13, 2007

(54) METHOD FOR PRODUCING A FIBER COMPOSITE COMPONENT, AND APPARATUS FOR PRODUCING SUCH A COMPONENT

(76) Inventors: Marco Ebert, An der Brucke 1, 35094 Lahntal (DE); Thorsten Scheibel, Am Haingraben 19, 61231 Bad Nauheim (DE); Martin Henrich, Ziegelhausweg 4, 35582 Wetzler (DE); Roland Weiss, Talstrasse 59, 35625 Huttenberg (DE)

( * ) Notice: Subject to any disclaimer, the term of this patent is extended or adjusted under 35 U.S.C. 154(b) by 0 days.

(21) Appl. No.: 09/725,453

(22) Filed: Nov. 30, 2000

(65) Prior Publication Data

US 2002/0162624 A1 Nov. 7, 2002

(30) Foreign Application Priority Data

Dec. 1, 1999 (DE) ................................ 199 57 906

(51) Int. Cl.
*C01B 31/00* (2006.01)

(52) U.S. Cl. .................... 264/29.1; 156/89.26; 156/93; 156/245

(58) Field of Classification Search ............. 156/89.26, 156/93, 245, 305, 169, 172, 175, 173, 425, 156/433, 441, 92; 264/29.1, 29.2
See application file for complete search history.

(56) References Cited

U.S. PATENT DOCUMENTS 2,384,303 A * 9/1945 Heath .......................... 52/668
3,927,950 A * 12/1975 Herrmann et al. .......... 403/346
4,086,378 A * 4/1978 Kam et al. ................. 428/34.5
4,284,679 A * 8/1981 Blad et al. .................. 428/218
4,337,872 A * 7/1982 Wright ....................... 220/491
4,659,624 A * 4/1987 Yeager et al. ............... 428/408

(Continued)

FOREIGN PATENT DOCUMENTS

WO 92/11126 7/1992

(Continued)

OTHER PUBLICATIONS

Matthiej, et al, “Tailored Fiber Placement-Mechanical Properties and Applications”, Journal of Reinforced Plastics and Composites, vol. 17, No. 9, 1998, pp. 774-786.*

*Primary Examiner*—Jeff H. Aftergut
(74) *Attorney, Agent, or Firm*—Dennison, Schultz & MacDonald

(57) ABSTRACT

The invention relates to a method for producing a fiber composite component having at least one intersection point. An apparatus for producing a component, comprising fiber composite material, including lower and upper dies of a pressing tool and optionally a heat source, by means of which source the fiber composite material can be heated during its subjection to pressure in the pressing tool. To make it possible to produce a non-warping, lightweight, easily manipulated component with at least one intersection point, in particular a grate, it is proposed that an integral component (preform) of the same or substantially the same material thickness and/or the same or substantially the same fiber volume content at the at least one intersection point and adjoining portions of the component is placed in a mold which predetermines or substantially predetermines its final geometry, and before or after being placed in the mold is provided with a monomer such as resin or a polymer and then cured.

21 Claims, 2 Drawing Sheets

U.S. PATENT DOCUMENTS 4,679,291 A * 7/1987 Schmeal et al. .............. 156/92
4,735,672 A * 4/1988 Blad .......................... 156/361
4,990,390 A 2/1991 Kawasaki et al.
5,080,851 A * 1/1992 Flonc et al. ................ 264/258
5,110,627 A * 5/1992 Shoesmith et al. ...... 427/208.4
5,152,949 A * 10/1992 Leoni et al. ................ 264/257
5,227,236 A * 7/1993 Handermann ............... 428/361
5,246,306 A * 9/1993 Shoesmith et al. ........... 404/70
5,380,477 A * 1/1995 Kent et al. .................. 264/103
5,418,063 A * 5/1995 Booth ........................ 428/408
5,518,564 A * 5/1996 Darrieux ...................... 156/93
6,073,670 A * 6/2000 Koury ........................ 156/425
6,290,799 B1* 9/2001 Deckers et al. ............. 156/264
2006/0199132 A1* 9/2006 Scheibel et al. ............ 432/120

FOREIGN PATENT DOCUMENTS

WO WO-99/22932 A1 * 5/1999

* cited by examiner

METHOD FOR PRODUCING A FIBER COMPOSITE COMPONENT, AND APPARATUS FOR PRODUCING SUCH A COMPONENT

BACKGROUND OF THE INVENTION

The invention relates to a method for producing a fiber composite component having at least one intersection or node point. An apparatus for producing a component, comprising fiber composite material, including lower and upper dies of a pressing tool and optionally a heat source, by means of which source the fiber composite material can be heated during its subjection to pressure in the pressing tool.

In high-temperature furnace and factory construction, in the hardening and sintering industry, bases of preferably gridlike structure that are resistant to high temperature and that must have high mechanical strength are used. CFC (carbon fiber reinforced carbon) grates have proven themselves for this purpose. In the prior art, they are put together from strips or are made from plate material, for instance by waterjet cutting. Grates of metal high temperature alloys made by casting are also known.

When CFC strip material is used, it must be cut out in the region of the intersection points in order to assure that the bearing area of the grid extends in the same plane, or in other words that no thickening of material is present in the region of the intersection points.

Such work is complicated and thus expensive. The same is true for the case where grids are cut out of plate material, since in this case the material waste is undesirably high. The known grates comprising CFC materials consequently have disadvantages with regard to machining and production costs and with regard to joining in the case of plugged-together systems.

The disadvantages in these regards may possibly not arise with grates made by casting. However, such grates have an undesirably high thermal capacity and can warp in the presence of frequently changing temperatures. The usage temperatures are also limited. A tendency to creepage and major wall thicknesses can be named as further disadvantages.

From International Patent Disclosure WO92/11126, a textile composite material with reinforcing fibers is known in which the intersection or node points have a greater thickness than the adjoining regions.

In order to produce a grid made of reinforcing fibers that has different elasticity in different directions, according to WO92/11126, first fiber bundles have a number of fibers that differs from second fiber bundles. After the production of the grid, the cross section of the grid in the region of the node points can be adapted to that of the adjoining regions by the exertion of pressure.

SUMMARY OF THE INVENTION

The object of the present invention is to refine a method and an apparatus of the type defined at the outset in such a way that a nonwarping, lightweight, easily manipulated component with at least one intersection point, in particular a grate, can be produced that has shape stability and can be produced economically.

In terms of the method, this object is essentially attained in that an integral component (preform) of the same or substantially the same material thickness and/or the same or substantially the same fiber volume content at the at least one intersection point and adjoining portions of the component is placed in a mold which predetermines or substantially predetermines its final geometry, and before or after being placed in the mold is provided with a monomer such as resin or a polymer and then cured. In particular, it is provided that the preform, for curing, is subjected to a heat treatment. A blank thus produced can then pyrolized. The curing of the fiber preform takes place in the mold, and the pyrolizing and carbonizing and/or graphitizing are done place outside the mold.

In particular, a fiber preform is used that as its fibers has roving strands and/or fibers or slivers comprising natural, glass, aramide, polymer, carbon and/or ceramic fibers. As the resin itself, a phenol-derived resin, such as resol in particular, is especially used.

Although preferably the preform is impregnated or saturated with resin, and a phenol-derived resin is to be emphasized, the possibility also exists that along with the reinforcing fibers, polymer fibers that form the matrices, such as PEEK fibers, PPS fibers, PA fibers, PE fibers or PP fibers are used.

It should also be pointed out that the teaching of the invention is also intended for producing components that comprise fiber reinforced plastic material. The preform used can be subjected to cold or hot curing. Corresponding components comprising fiber-reinforced plastic can furthermore be at least carbonized but also carbonized and graphitized, making components of fiber reinforced carbon or graphite available. As preferred reinforcing fibers, ceramic fibers such as SiC fibers or carbon fibers can be named.

In other words, with the teaching of the invention both fiber-reinforced plastic components and fiber reinforced carbon components can be made, which are distinguished in particular by their high-temperature resistance.

The fiber preforms are produced in particular by tailored fiber placement (TFP) technology. In this, fiber material unwound from a spool is laid and joined with sewing thread in such a way that a preform of desired geometry is available; different material thicknesses can be attained by stitching repeated layers on top of one another.

Preforms made by TFP technology and having intersection points such as nodes have the advantage that the fiber volume is the same or substantially the same over the entire preform, as long as endless fibers are used as the reinforcing fibers. In other words, the volume at the intersection point or node is approximately the same as that of the crosspieces that connect the intersection points or nodes. This is an emphatic advantage over the components of endless fibers produced by the prior art, in which at the intersection or node points there is a markedly increased fiber volume, normally twice as high.

As the reinforcing fibers themselves, co-woven fibers, site-woven fibers, commingled fibers, intermingled fibers, demixed staple fiber yarns, or respool-spun fibers are especially suitable, along with other well-known endless fibers.

It is also possible to produce the preforms by tow placement methods with appropriate final pressing, or by the resin transfer molding (RTM) technique.

By the production methods known per se, a preform is made that can have a grid shape; as a result of the laying of the reinforcing fibers and stitching them at the intersection points, a material thickness that is equivalent to the thickness between the intersection points is attainable. A thus-produced preform is then impregnated with resin and placed in a die of a pressing tool, which die in turn has mold voids that correspond to the geometry of the preform and thus of the final form. The voids themselves are defined by flexible elements, so that regardless of the shrinkage that occurs in curing, a release of the cured preform (blank) is possible by exerting pressure on the flexible elements. During the curing, a further die, which corresponds to the negative shape of the voids that receive the preform, acts on the preform. This is preferably a die comprising metal, such as steel.

The thus-cured blank is then carbonized at a temperature $T_1$ where 500° C.$\leqq T_1 \leqq$1450° C., and in particular 900° C.$\leqq T_1 \leqq$1200° C., or graphitized at a temperature $T_2$ where 1500° C.$\leqq T_2 \leqq$3000° C., and in particular 1800° C.$\leqq T_2 \leqq$2500° C.

An apparatus for producing a component, comprising fiber composite material, of the type defined at the outset is distinguished in particular in that one of the dies of the pressing tool has mold voids for receiving fiber composite material that are defined by flexible elements that follow a shrinkage of the fiber composite material upon heating, and that the other die has a geometry that is adapted to the voids. In particular, it is provided that the voids are formed by intersecting receptacles for the fiber composite material that are defined by the flexible elements, each of which has a block-like geometry. In this case, the further die engaging the voids or aligned with them has a gridlike geometry. The die itself is preferably of metal, such as steel.

BRIEF DESCRIPTION OF THE DRAWINGS

Further details, advantages and characteristics of the invention will become apparent not only from the claims and the characteristics learned from them—in isolation and/or in combination—but also from the ensuing description of preferred exemplary embodiments seen in the drawing.

Shown are.

Figure 2:
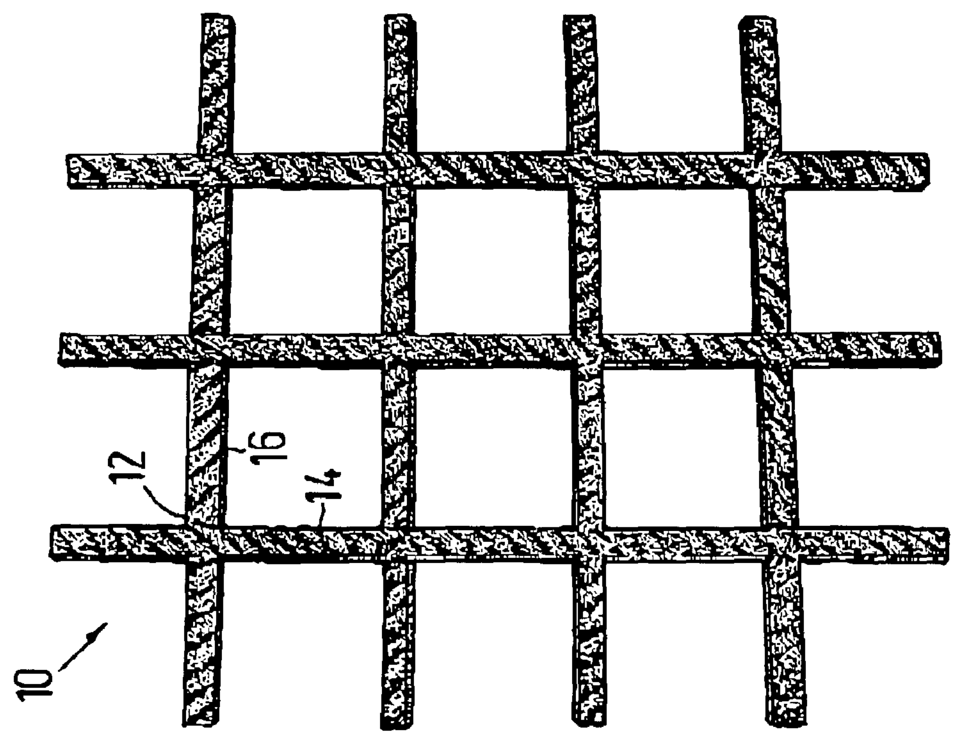
FIG. 2, a grid produced from the fiber preform of FIG. 1.
Figure 1:
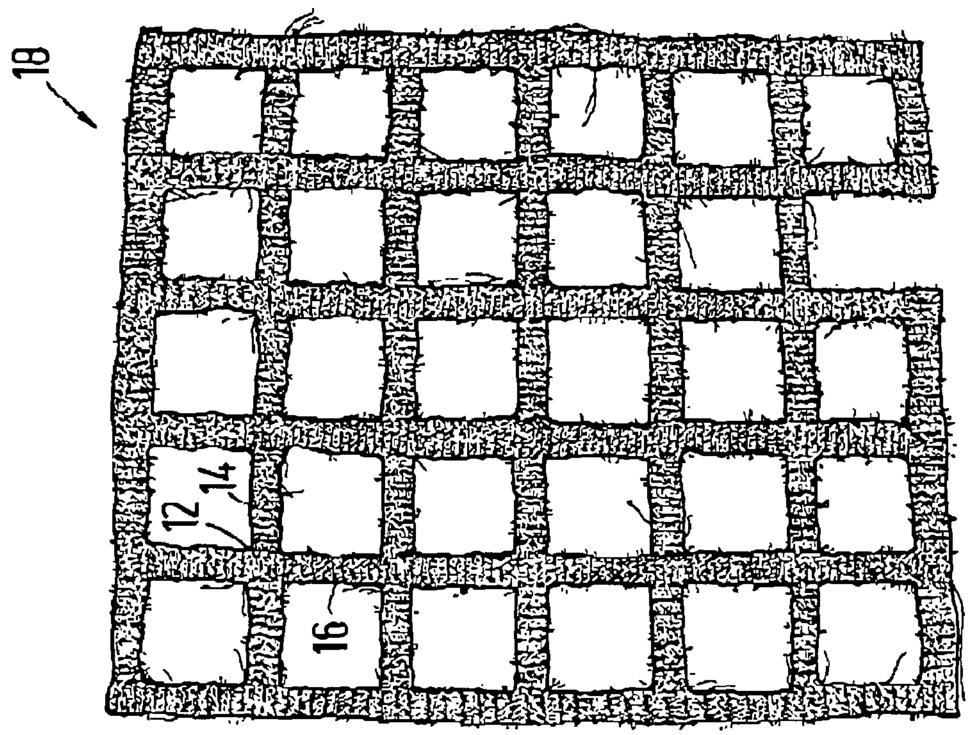
FIG. 1, a gridlike fiber preform.
Figure 3:
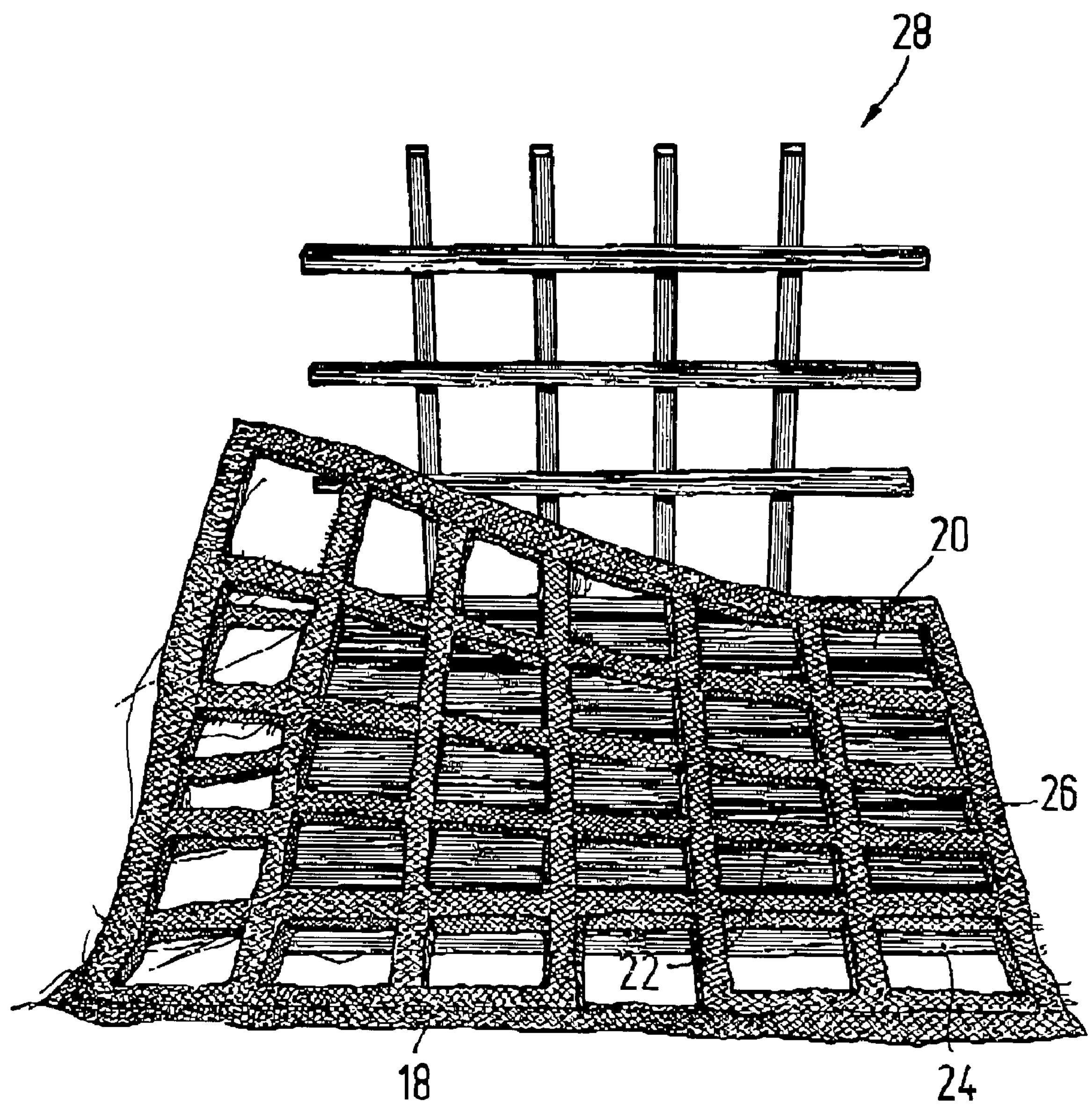
FIG. 3, elements of a pressing tool for producing a blank from the fiber preform of FIG. 1.

In the exemplary embodiments described below, a fiber composite component in the form of a grid 10 will be explained, but this is not intended to limit the teaching of the invention in any way. On the contrary, this teaching also extends to all instances of the application of a fiber composite component to be made by the method of the invention that is intended in particular for use in high-temperature furnace and factory construction, in the hardening and sintering industry, as column bases for chemical reactors, as core material for sandwich structures, or as batch carrier systems.

In order to make a corresponding component 10 available that even at its intersection points 12 has a thickness that does not differ from that in the adjoining region, that is, crosspieces 14, 16, a fiber preform or so-called preform 18 is used, which can be made by the tailored fiber placement (TFP) technology or a corresponding method. To that end, reinforcing fibers such as roving strands and/or fibers or slivers comprising natural, glass, aramide, polymer, carbon and/or ceramic fibers are laid and stitched in accordance with the geometry desired; at the intersection points 12, the fibers are laid in such a way that a thickness or cross section results that corresponds to that of the adjoining portions 14, 16.

It is also possible to produce the preforms by tow placement methods with appropriate final pressing, or by the resin transfer molding (RTM) technique.

Regardless of the method employed, the preform 18 has a substantially constant thickness over its entire area. The thus-produced preform 18 is then placed in a lower die 20 of a pressing tool, specifically in voids 22, which are formed by intersecting receptacles and which have a course of geometry that corresponds to that of the preform 18. The receptacles 22 are defined by flexible elements 26, which have a blocklike geometry. To that end, the flexible blocklike elements 26 originate at a metal base plate 24, and are disposed relative to one another and spaced apart from one another in such a way that a void geometry results that corresponds to the preform 18 and thus approximately to the final geometry of the fiber composite component 10.

Before the preform 18 is placed in the lower die 20, the preform 18 is saturated or impregnated with resin, in particular a phenol-derived resin. Alternatively or additionally, along with the reinforcing fibers, polymer fibers can be used that form the matrices or in other words perform the function of the resin. Thermoplastic fibers such as PEEK fibers, PPS fibers, PA fibers, PE fibers or PP fibers can be considered as the polymer fibers.

Once the preform 18 has been placed in the lower die 20, then because of the geometry of the exemplary embodiment, an upper die 28 corresponding to a grid is aligned with the receptacles 22, and then the lower die 20 and upper die 28 are closed, in order to exert the requisite pressure on the preform 18. Simultaneously a heat treatment is performed, such that curing of the resin-impregnated preform 18 or melting of the thermoplastic fibers occurs. Since in the curing shrinkage of the preform is possible, the crosspieces 14, 16 surround the elements 26 of the lower die 20 in clamping fashion. However, since the elements 26 are flexible, removing the cured preform 18 or blank merely requires compressing these elements to the requisite extent in order to remove the blank from the lower die 20.

Next, to the desired extent, carbonizing or graphitization of the blank is done in order to obtain a fiber composite component 10 as shown in FIG. 2. Thus as noted, each intersection point 12 has a thickness that corresponds to that of the crosspieces 14, 16. This in turn means that the grid 10 defines an area with a flat surface, so that a desired use, in particular as a base, for instance, is possible.

What is claimed is:

1. A method for producing a self-supporting fiber composite grid component having at least one intersection or node point, comprising the steps of:

obtaining an integral fiber preform by tailored fiber placement using continuous fibers laid and stitched to obtain a desired geometry having at least one intersection or node point, and having a substantially constant material thickness at the at least one intersection or node point and adjoining portions of the preform, placing the preform in a mold having voids for receiving the preform, the mold substantially predetermining the component in final geometry, providing the fiber preform having a substantially constant material thickness, before or after being placed in the mold, with a monomer or polymer, curing the monomer or polymer with the preform in the mold to form a blank having at least one intersection or node point, and substantially constant material thickness at the at least one intersection or node point and adjoining portions of the blank and defining an area with a flat surface, removing the blank from the mold, and pyrolizing and carbonizing and/or graphitizing the blank removed from the mold to form the fiber composite grid component with substantially constant material thickness and a flat surface area.

2. The method of claim 1, wherein the preform comprises reinforcing fibers.

3. The method of claim 2, wherein the reinforcing fibers comprise co-woven fibers, site-woven fibers, commingled fibers, intermingled fibers, demixed staple fiber yarns, or respool-spun fibers.

4. The method of claim 3, wherein polymer fibers as matrices are added to the reinforcing fibers.

5. The method of claim 2, wherein the reinforcing fibers comprise endless fibers.

6. The method of claim 2, wherein the reinforcing fibers comprise roving strands and/or fibers comprising natural, aramide, carbon and/or ceramic fibers.

7. The method of claim 1, wherein the curing step comprises disposing the preform between a lower die and an upper die of a pressing tool in the mold, one of the dies having mold voids which are defined by flexible elements and which predetermine the final circumferential geometry of the blank.

8. The method of claim 7, additionally comprising, for removing the blank from the mold voids, deforming the flexible elements.

9. The method of claim 1, wherein the pyrolizing comprises carbonizing the blank at a temperature $T_1$ where 500° C.$\leqq T_1 \leqq$1450° C.

10. The method of claim 9, wherein 900° C.$\leqq T_1 \leqq$1200° C.

11. The method of claim 1, wherein the graphitizing the blank takes place at a temperature $T_2$ where 1500° C.$< T_2 \leqq$3000° C.

12. The method of claim 11, wherein 1800° C.$\leqq T_2 \leqq$2500° C.

13. The method of claim 1, wherein the providing step comprises impregnating or saturating with a resin and/or provided with at least one polymer fiber as a matrix, and wherein the curing comprises subjecting to a heat process for hardening.

14. The method of claim 1, wherein the fiber preform is provided with the monomer before being placed in the mold and is subjected to the heat process in the mold.

15. The method of claim 1, wherein the monomer or polymer is a phenol-derived resin.

16. The method of claim 1, wherein the component is an integral grid of a height that remains constant as a component.

17. The method of claim 1, wherein the component is of fiber reinforced carbon.

18. The method of claim 1, wherein a blank comprising fiber reinforced plastic material is carbonized and/or graphitized.

19. A method for producing a self-supporting fiber composite grid component having at least one intersection or node point, comprising the steps of:

obtaining an integral fiber preform by tailored fiber placement using continuous fibers laid and stitched to obtain a desired geometry having at least one intersection or node point, placing the preform in a mold having voids for receiving the preform defined by flexible elements which follow shrinkage of the preform, the mold substantially predetermining the component in final geometry, providing the fiber preform before or after being placed in the mold, with a monomer or polymer, and curing the monomer or polymer with the preform in the mold to form a blank having at least one intersection or node point, and removing the blank from the mold and pyrolizing the blank to form the self-supporting fiber composite grid component having a flat surface area.

20. The method of claim 19, wherein the providing step comprises impregnating or saturating with a resin and/or provided with at least one polymer fiber as a matrix, and wherein the curing comprises subjecting to a heat process for hardening.

21. The method of claim 20, wherein the fiber preform is provided with the monomer before being placed in the mold and is subjected to the heat process in the mold.

* * * * *